June 27, 1939.  I. GUIDUCCI  2,164,109

DOUBLE SAFETY WASHER FOR NUTS OF THREADED BOLTS

Filed Feb. 6, 1937

I. Guiducci
Inventor

By Glascock Downing & Seebold
Attys.

Patented June 27, 1939

2,164,109

UNITED STATES PATENT OFFICE 2,164,109

DOUBLE SAFETY WASHER FOR NUTS OF THREADED BOLTS

Igino Guiducci, Tivoli, Italy

Application February 6, 1937, Serial No. 124,510
In Italy February 6, 1936

2 Claims. (Cl. 151—41)

The present invention relates to safety washers for the nuts of threaded bolts, and has for its object some important improvements to the double washer described in my U. S. Patent No. 2,124,249, of July 19, 1938.

The invention consists in some modifications which have been made in the arrangement of the teeth and of the fins and in the addition of special tongues, although the fundamental principles of the original invention as disclosed in the patent remain unaltered, particularly the feature that the lock washer is composed of two elements which are duplicates and interchangeable.

In the present description reference is made to the accompanying drawing, in which.

It is to be understood that the washers shown in the above-mentioned drawing could be modified without departing from the scope of the invention, as they would always correspond with the essential features specified in the aforementioned patent.

Figure 1:
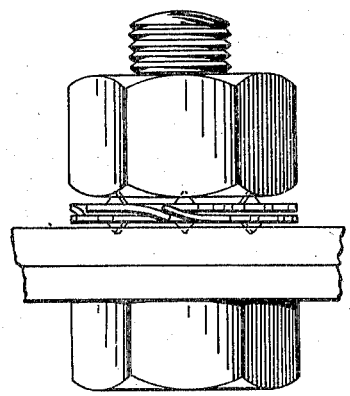
Fig. 1 is a view in elevation of a bolt showing the piece to be fastened and the nut, provided with the double washer in accordance with the invention.
Figure 2:
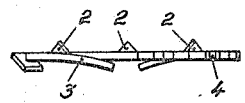
Fig. 2 is a side view of one of the washer members shown in Fig. 1.
Figure 3:
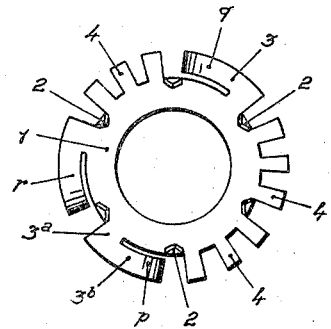
Fig. 3 is a plan view of the washer member shown in Fig. 2.

Referring to Figs. 1 to 3, the double washer in accordance with the present invention is composed, like that described in said patent, of two washer members which are duplicates of one another, each of which has a smooth face and a face provided with pointed lateral projections or teeth 2 arranged along the external periphery of the annular part 1, preferably triangular in shape and arranged in a substantially perpendicular direction to the plane of the washer. Moreover, each washer is provided with the fins 3, each of which is composed of a part 3a, connected to and in the same plane as the annular part 1 of the washer, the limb 3b being suitably arranged in the peripheral direction of the part 3a, which is separated by means of a cut from the annular part 1 and has a suitable lateral inclination relatively to the plane of the annular part.

The distribution of the fins on the periphery of each of the washers, instead of being symmetrical, is asymmetrical, the unequal spaces between two consecutive fins having equally spaced tongues 4, projecting radially from the external periphery of the annular portion 1, and of a number proportional to the size of the space. The spaces between the tongues may be equal or unequal.

By way of example, as shown in Fig. 3 between the fins p and q six radial tongues are arranged, while between the fins q and r there are three tongues, and between the fins r and p there is no tongue. Of course the distribution of the tongues may be varied.

A further modification to the washer comprises the arrangement of the teeth 2 spaced equal distances from each other.

The washer shown in Figs. 1 to 3 is also used with the smooth faces of the two washers in contact with each other, (Fig. 1), and arranged in such a manner that the teeth 2 project from both faces of the washers, to engage, during the tightening of the nut, the piece with which each washer is in contact, i. e., the nut itself and the piece to be fastened respectively. As soon as such contact takes place, the teeth 2 grip the parts, in such a way that an immediate and permanent fastening is effected between each washer and the adjacent part. However, the washer member which has engaged the part to be fastened remains fixed with relation to the latter, while the other washer member is carried by the nut in its movement until the complete tightening of the latter.

The tongues, which form one of the principal features of the present invention, function in the following manner. The tongues of each washer, which at the end of the tightening of the nut have passed just beyond a fin of the companion washer, fix themselves in the cuts which are arranged between the periphery of the annular part 1 and the limbs 3b of the fins projecting from this part, thus forming the stop which effects the locking. In one position of each turn the locking can also be effected by the engagement of the limbs 3b of each washer with the fins of the companion washer. In general, the end of the tightening of the parts does not occur exactly in a locking position, and when one of these positions has been passed it is not usually possible or convenient to tighten the nut still further so as to reach the locking position immediately following. Consequently when the tightening of the nut has been completed, a very slight backward movement is necessary in the majority of cases for the locking to be effected; this movement is effected by the loosening caused by the vibrations of the bolt on which the washer is mounted, and is least when the engagement occurs between tongues and fins, whilst it is somewhat less slight when the engagement takes place between fins of the cooperating washers. The purpose of the asymmetrical arrangement of the fins in accordance with the present invention is to reduce to only one in each turn the positions in which the locking can be effected by the engagement of the fins of the two cooperating washers with each other, whereas when the arrangement of the fins is symmetrical, as shown in my Patent No. 2,124,249, there are obviously in each turn as many positions of engagement between fins of cooperating washers as there are number of fins on each washer. With the arrangement of fins and tongues employed in accordance with the present invention, the space between two consecutive locking positions is therefore reduced to whatever slight fraction of a turn is desired, and this in certain applications may constitute a material advantage.

The further fact that the teeth 2 are always placed at equally spaced distances from one another ensures the result that, when the nut is tightened, there always corresponds exactly to each tooth one of the notches formed by the same tooth, or it may be by another washer of the same type previously employed on the nut or the part to be fastened.

The distribution of the teeth 2 at strictly equal distances must be understood to apply not only to a single washer, but must apply to all the washer elements of any size whatsoever, in order that when, for any reason, one element is replaced by another, the teeth will always penetrate into the notches made by the first washer placed in position, while if the spaces between the teeth of replaceable washers were different, there might be formed after a few washers had been replaced, not only a certain number of notches of penetration but even a circular groove.

Figure 4:
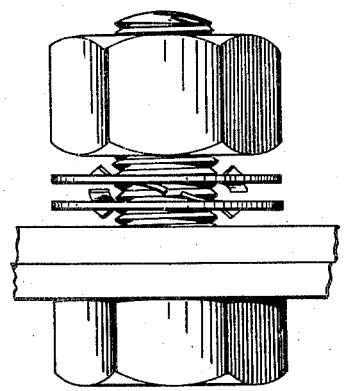
Fig. 4 is a view in elevation of a bolt with the piece to be fastened and the binding nut, before the nut is tightened, provided with a double washer according to the invention, of a type which forms a variation from that shown in the preceding figures.
Figure 5:
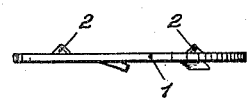
Fig. 5 is a side view of one of the washer members of the type shown in Fig. 4.
Figure 6:
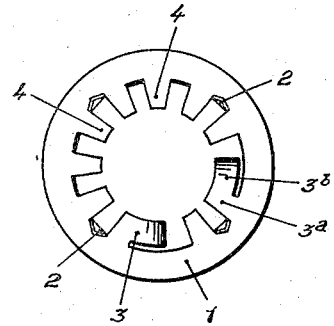
Fig. 6 is a plan view of the washer member of Fig. 5.

In the form of construction shown in Figs. 4 to 6, the teeth 2 are arranged along the internal periphery of the annular part 1 of each element of the double washer and the fins 3 and the tongues 4 project from the same internal periphery. Of course in such a case it is necessary that both the tongues and the fins terminate along a circumference whose diameter is slightly greater than that of the bolt on which the washer is applied. The external diameter of the washer may be greater than that of the circle inscribed by the nut. The action of the washer in accordance with this variation is identical with that of the type of construction previously described.

Having now described and ascertained the nature of my invention and in what manner it is to be performed, I declare that what I claim is:

1. A double safety lock washer for nuts of threaded bolts, comprising two oppositely disposed duplicate washer members, each member including an annular body portion, a series of fins extending circumferentially in one direction and having the free ends thereof deflected laterally of one face of the body portion, a series of biting teeth projecting from the opposite face of the body and facing in the same circumferential direction as said fins, said biting teeth being arranged substantially perpendicular to the plane of the annular part of the washer and arranged at equally spaced arcuate distances from each other, and radial tongues extending from and arranged in the plane of said annular body, said tongues and fins cooperating to form a locking engagement between the washer members.

2. A double safety lock washer for nuts of threaded bolts, comprising two oppositely disposed duplicate washer members, each member including an annular body portion, a series of fins extending circumferentially in one direction and having the free ends thereof deflected laterally of one face of the body portion, said fins being arranged unsymmetrically to provide unequal arcuate spaces between the successive fins, a series of biting teeth projecting from the opposite face of the body and facing in the same circumferential direction as said fins, and radial tongues extending from and arranged in the plane of said annular body, the number of said radial tongues varying in the different arcuate spaces between the fins so that in one position of a complete turn locking is effected by the engagement of the fins of each washer member with the fins of the companion member, and in all other positions locking is effected by the engagement of the tongues of one member with the fins of the other member.

IGINO GUIDUCCI.